(12) United States Patent
Barnwell

(10) Patent No.: US 11,376,932 B2
(45) Date of Patent: Jul. 5, 2022

(54) MODULAR CANOPY ASSEMBLY

(71) Applicant: Alex Barnwell, Marysville, WA (US)

(72) Inventor: Alex Barnwell, Marysville, WA (US)

( * ) Notice: Subject to any disclaimer, the term of this patent is extended or adjusted under 35 U.S.C. 154(b) by 0 days.

(21) Appl. No.: 17/109,774

(22) Filed: Dec. 2, 2020

(65) Prior Publication Data

US 2022/0169100 A1 Jun. 2, 2022

(51) Int. Cl.
*B60J 7/04* (2006.01)
*B62D 33/02* (2006.01)
*B60J 10/90* (2016.01)
*B60J 7/19* (2006.01)
*B60J 1/18* (2006.01)

(52) U.S. Cl.
CPC . *B60J 7/04* (2013.01); *B60J 1/18* (2013.01); *B60J 7/19* (2013.01); *B60J 10/90* (2016.02); *B62D 33/02* (2013.01)

(58) Field of Classification Search
CPC ..... B60J 7/11; B60J 7/1607; B60J 7/19; B60J 10/90; B60J 7/106; B60J 1/007; B62D 33/04
USPC ..................... 296/100.02
See application file for complete search history.

(56) References Cited

U.S. PATENT DOCUMENTS

| 3,955,845 A * | 5/1976 | Werner | B62D 33/08 296/10 |
| 3,989,148 A * | 11/1976 | Donohue | B60P 7/02 414/537 |
| 4,799,726 A | 1/1989 | Scott | |
| 4,824,157 A | 4/1989 | Nielsen et al. | |
| D328,062 S | 7/1992 | Burgess | |
| 5,423,587 A * | 6/1995 | Ingram | B60P 3/32 135/88.13 |
| 5,556,156 A * | 9/1996 | Kirk | B60J 7/102 135/88.05 |
| 7,988,218 B1 * | 8/2011 | Devine | B62D 33/044 296/100.02 |
| 8,540,302 B2 | 9/2013 | Lenz, Jr. | |
| 9,150,087 B2 | 10/2015 | Aho | |
| 10,815,709 B2 * | 10/2020 | Lovasz | B60J 7/194 |
| 2003/0164621 A1 * | 9/2003 | Krause | B60R 9/00 296/3 |
| 2003/0168874 A1 | 9/2003 | Bautista | |

(Continued)

FOREIGN PATENT DOCUMENTS

| CN | 208180869 U | * 12/2018 | |
| DE | 202020100142 U1 | * 2/2020 | B60J 7/20 |

(Continued)

*Primary Examiner* — D Glenn Dayoan
*Assistant Examiner* — Kevin P Weldon

(57) ABSTRACT

A modular canopy assembly for enclosing a bed of a truck includes a frame and a set of panels. The frame comprises a set of first elements and a set of second elements. The first elements are mountable to a bed of a truck. The second elements are selectively engageable to the set of first elements so that the frame extends upwardly from the bed of the truck. The frame defines a top opening, a front opening, a rear opening, and opposed side openings. Each panel is selectively engageable to the frame to close a respective one of the top opening, the front opening, the rear opening, and the opposed side openings. The panels can be engaged to the frame to selectively enclose the bed of the truck.

12 Claims, 6 Drawing Sheets

(56) References Cited

U.S. PATENT DOCUMENTS

2005/0274279 A1* 12/2005 Neumann ............ B61D 39/002
                                                                    105/377.09
2019/0118628 A1*  4/2019 Kramer ................. B60J 7/0061
2021/0114445 A1*  4/2021 Deckard ................ B60J 7/1607
2021/0129643 A1*  5/2021 Voss ....................... B60J 7/1607
2021/0394835 A1* 12/2021 Hunt ..................... B62D 33/04

FOREIGN PATENT DOCUMENTS

GB            2580081 A  *  7/2020  ................ B60J 7/16
WO     WO2014138605          9/2014
WO     WO-2021142414 A1 *  7/2021  .............. B60J 10/82

* cited by examiner

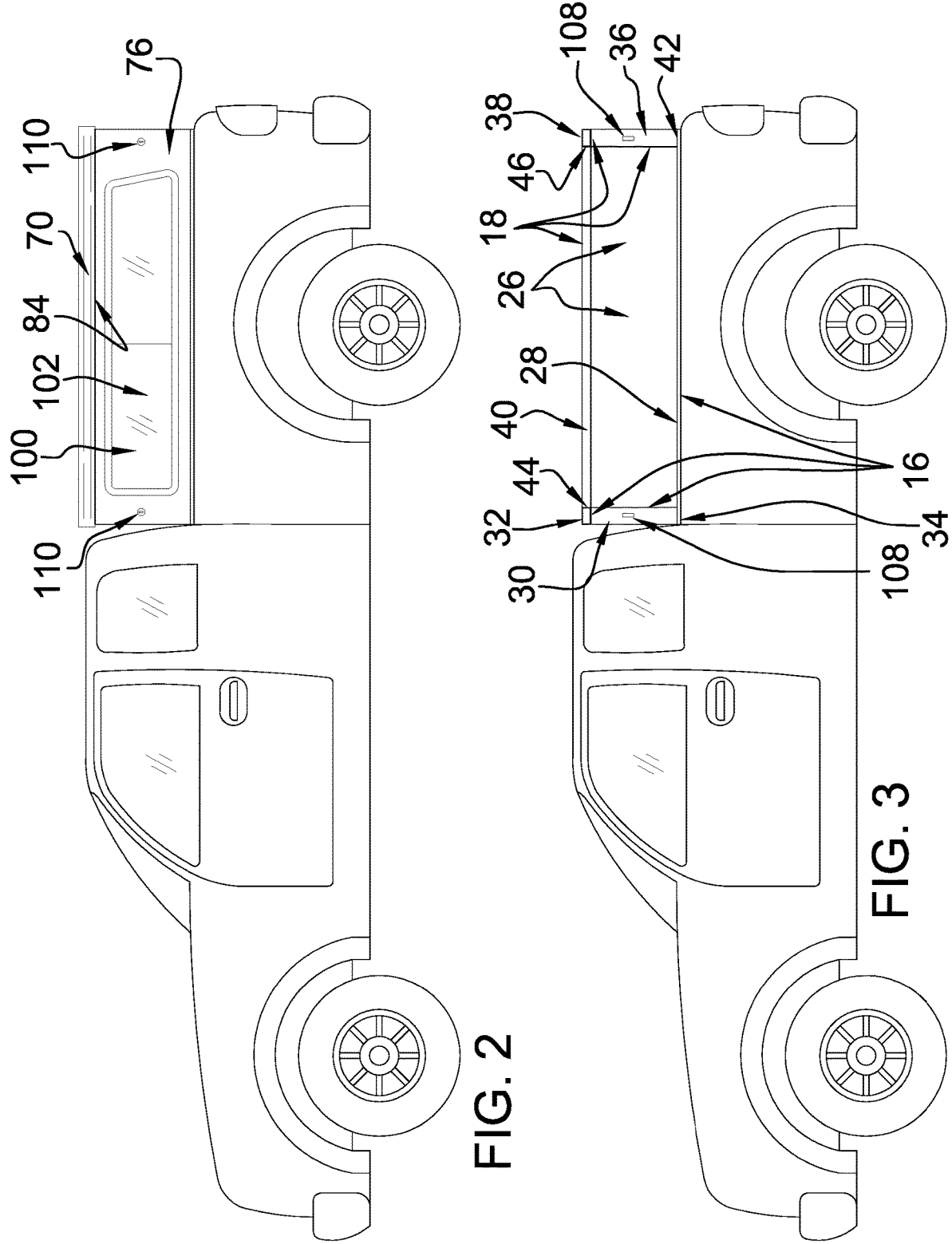

MODULAR CANOPY ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to canopy assembly and more particularly pertains to a new canopy assembly for enclosing a bed of a truck.

(2) Description of Related Art Including Information Disclosed Under 37 CFR 1.97 and 1.98

The prior art relates to canopy assemblies for enclosing beds of trucks. Prior art canopy assemblies may comprise detachable, foldable panels, meshed panels, nestable canopy sections, bed inserters upon which canopies can be positioned, and canopies having removable roof panels that can serve as ramps. What is lacking in the prior art is a modular canopy comprising a frame and a set of panels, wherein the panels are selectively couplable to the frame and the frame comprises first elements permanently mounted to a truck and second elements removably couplable to the first elements.

BRIEF SUMMARY OF THE INVENTION

An embodiment of the disclosure meets the needs presented above by generally comprising a frame and a set of panels. The frame comprises a set of first elements and a set of second elements. The first elements are configured to be mountable to a bed of a truck. The second elements are selectively engageable to the set of first elements so that the frame extends upwardly from the bed of the truck. The frame defines a top opening, a front opening, a rear opening, and opposed side openings. Each panel is selectively engageable to the frame to close a respective one of the top opening, the front opening, the rear opening, and the opposed side openings. The panels thus are configured to selectively enclose the bed of the truck.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is an in-use view of an embodiment of the disclosure.

FIG. 3 is an in-use view of an embodiment of the disclosure.

DETAILED DESCRIPTION OF THE INVENTION

Figure 1:
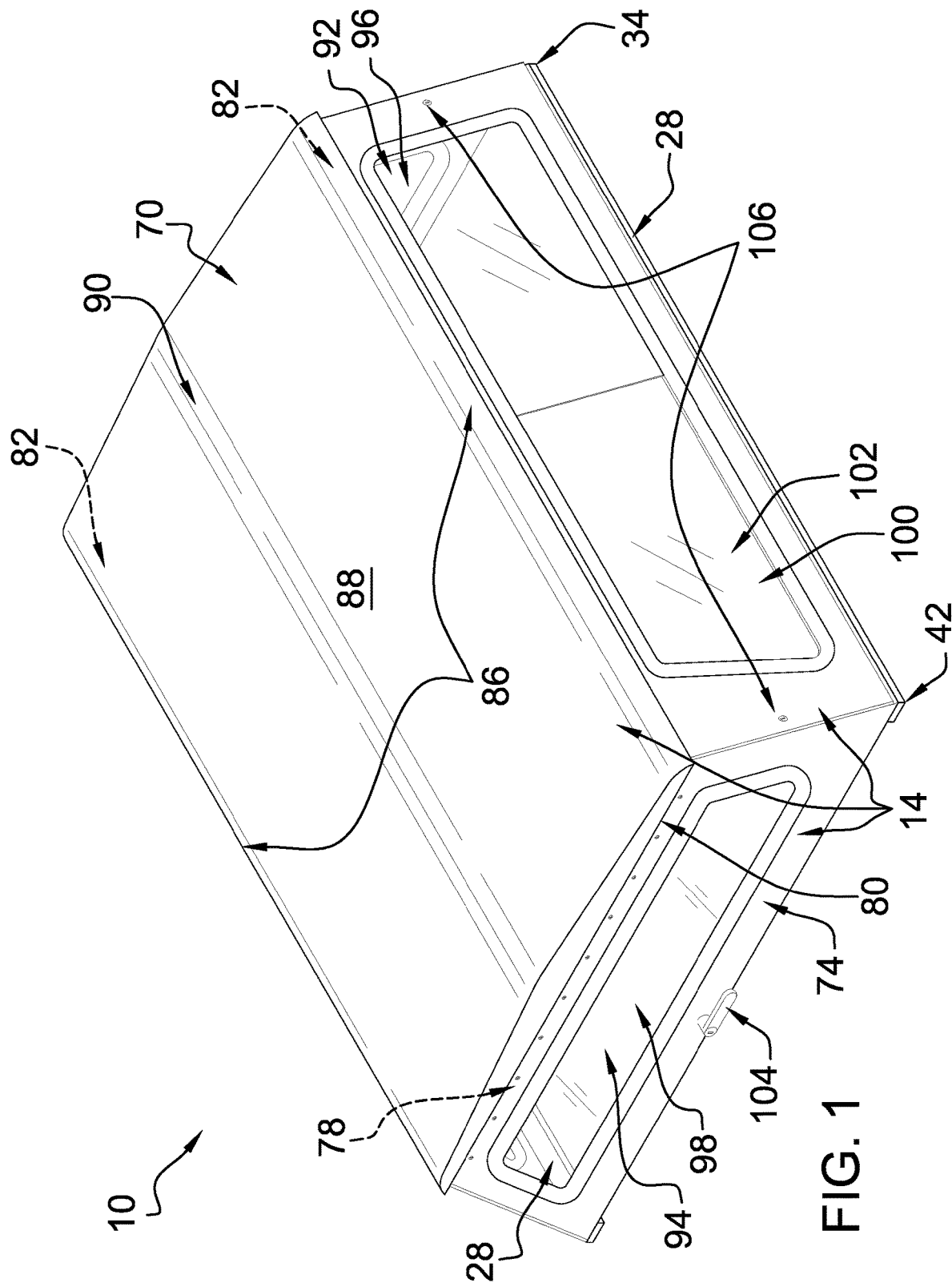
FIG. 1 is an isometric perspective view of a modular canopy assembly according to an embodiment of the disclosure.

With reference now to the drawings, and in particular to FIGS. 1 through 7 thereof, a new canopy assembly embodying the principles and concepts of an embodiment of the disclosure and generally designated by the reference numeral 10 will be described.

As best illustrated in FIGS. 1 through 7, the modular canopy assembly 10 generally comprises a frame 12 and a set of panels 14. The frame 12 comprises a set of first elements 16 and a set of second elements 18. The first elements 16 are configured to be mountable to a bed of a truck. The second elements 18 are selectively engageable to the set of first elements 16 so that the frame 12 extends upwardly from the bed of the truck. The frame 12 defines a top opening 20, a front opening 22, a rear opening 24, and opposed side openings 26.

Each panel 14 is selectively engageable to the frame 12 to close a respective one of the top opening 20, the front opening 22, the rear opening 24, and the opposed side openings 26. The panels 14 thus are configured to selectively enclose the bed of the truck.

The set of first elements 16 comprises a pair of lower side rails 28, a pair of front posts 30, and a front beam 32. The lower side rails 28 are configured to be engaged singly to sidewalls of the bed of the truck. The present invention anticipates the lower side rails 28 being configured for screwing, bolting, or welding to the sidewalls of the bed of the truck. Each front post 30 is engaged to and extends from a forward end 34 of a respective lower side rail 28. The front beam 32 is engaged to and extends between the front posts 30 distal from the lower side rails 28.

The set of second elements 18 comprises a pair of rear posts 36, a rear beam 38, and a pair of upper side rails 40. Each rear post 36 is selectively engageable to a rearward end 42 of a respective lower side rail 28. The rear post 36 extends in parallel with an associated front post 30. The rear beam 38 is engaged to and extends between the rear posts 36 distal from the lower side rail 28. Each upper side rail 40 has a first end 44 and a second end 46 selectively engageable to a respective opposed end 48 of the rear beam 38 and to a respective opposing end 50 of the front beam 32, respectively, so that the upper side rail 40 extends therebetween.

Each lower side rail 28 has a mortice 52 positioned therein proximate to the rearward end 42. The rear post 36 has a tenon 54 engaged thereto and extending from a lower end 56 thereof. The tenon 54 is complementary to the mortice 52 positioned in the respective lower side rail 28. The mortice 52 is positioned for selective insertion of the tenon 54 to removably engage the rear post 36 to the respective lower side rail 28.

The lower side rail 28 has a set of first holes 58 positioned therein adjacent to the mortice 52. The tenon 54 has a set of second holes 60 positioned therein so that each second hole 60 is aligned with an associated first hole 58 when the tenon 54 is inserted into the mortice 52. The second hole 60 and the associated first hole 58 are positioned for insertion of a respective article of mounting hardware (not shown, but may include screws, bolts, and the like) to secure the rear post 36 to the lower side rail 28.

Each opposed end 48 of the rear beam 38 and each opposing end 50 of the front beam 32 have a tab 62 engaged thereto and extending therefrom. Each of the tabs 62 has a set of fastening holes 64 positioned therethrough. Each of the fastening holes 64 is configured for insertion of a respective article of mounting hardware (not shown, but may include screws, bolts, and the like) to removably engage the upper side rails 40 to the front beam 32 and the rear beam 38. The present invention anticipates other methods of removably engaging the upper side rails 40 between the front beam 32 and the rear beam 38, as will be known to those skilled in the art of frame assembly.

Figure 5:
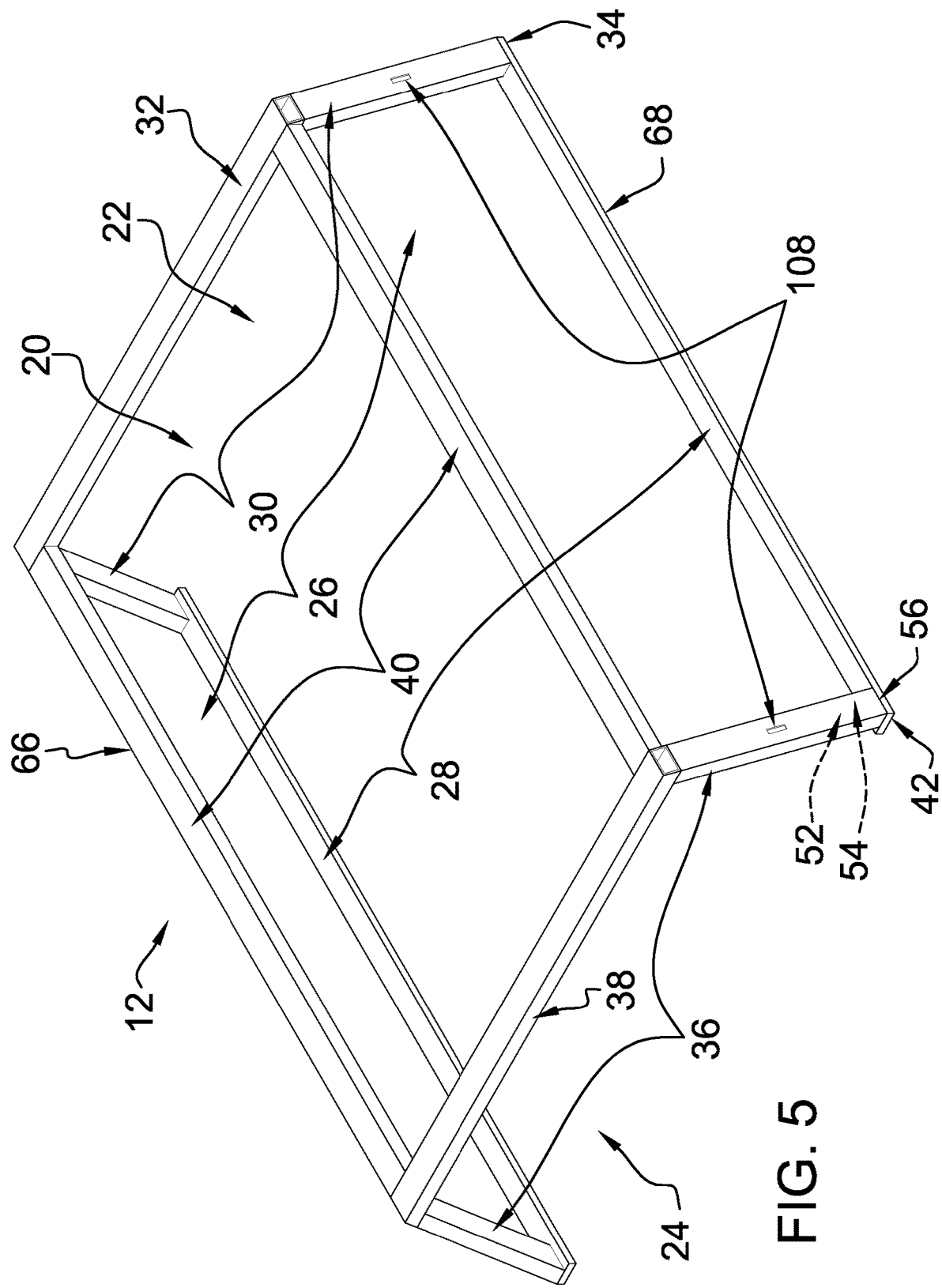
FIG. 5 is a detail view of an embodiment of the disclosure.
Figure 6:
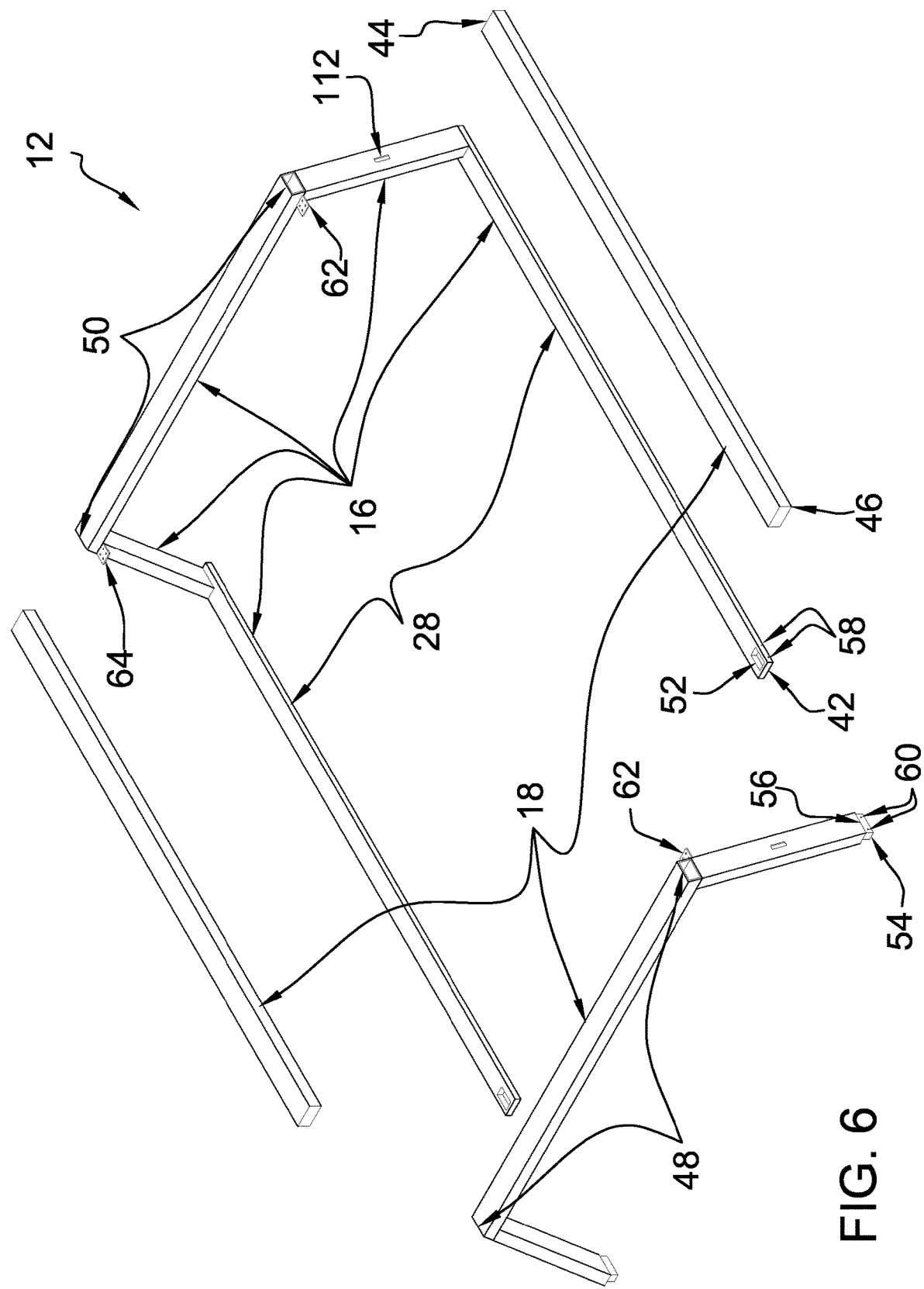
FIG. 6 is an exploded view of a frame an embodiment of the disclosure.

The rear posts 36 and the front posts 30 may extend transversely from the lower side rails 28 so that an upper perimeter 66 of the frame 12 is circumferentially smaller than a lower perimeter 68 thereof, as shown in FIG. 5. The rear posts 36 and the front posts 30 also may extend transversely from the lower side rails 28 so that the upper perimeter 66 of the frame 12 is circumferentially larger than the lower perimeter 68 (not shown). Additionally, the rear posts 36 and the front posts 30 may extend perpendicularly from the lower side rails 28 so that the upper perimeter 66 and the lower perimeter 68 of the frame 12 are circumferentially equivalent (not shown).

The set of panels 14 comprises a roof panel 70, a front panel 72, a rear panel 74, and a pair of side panels 76. The roof panel 70 is selectively engageable to the frame 12 to close the top opening 20. The front panel 72 is selectively engageable to the frame 12 to close the front opening 22. The rear panel 74 is selectively engageable to the frame 12 to close the rear opening 24. A hinge 78 is engaged to and extends between the frame 12 and an upper edge 80 of the rear panel 74 so that the rear panel 74 is hingedly engaged to the frame 12. Each side panel 76 is selectively engageable to the frame 12 to close a respective opposed side opening 26.

The roof panel 70 has a pair of channels 82 extending into a lower face 84 thereof. Each channel 82 extends along a respective opposed side 86 of the roof panel 70. The channel 82 is positioned for slidable insertion of a respective upper side rail 40 to removably engage the roof panel 70 to the frame 12. The roof panel 70 has an upper surface 88, which tapers from a centerline 90 of the roof panel 70 to the opposed sides 86, as shown in FIG. 1, so that the roof panel 70 is configured to shed moisture.

The front panel 72 and the rear panel 74 have a front cutout 92 and rear cutout 94 positioned therein, respectively. A front window 96 is engaged to the front panel 72 and closes the front cutout 92. A rear window 98 is engaged to the rear panel 74 and closes the rear cutout 94. Each side panel 76 has a side cutout 100 positioned therein. Each of a pair of side windows 102 is engaged to a respective side panel 76 and closes an associated side cutout 100.

A latch handle 104 is rotationally engaged to the rear panel 74 and is configured to selectively engage a tailgate of the truck so that the rear panel 74 is fixedly engaged to the tailgate. The latch handle 104 is keyed so that the latch handle 104 is lockable.

Figure 7:
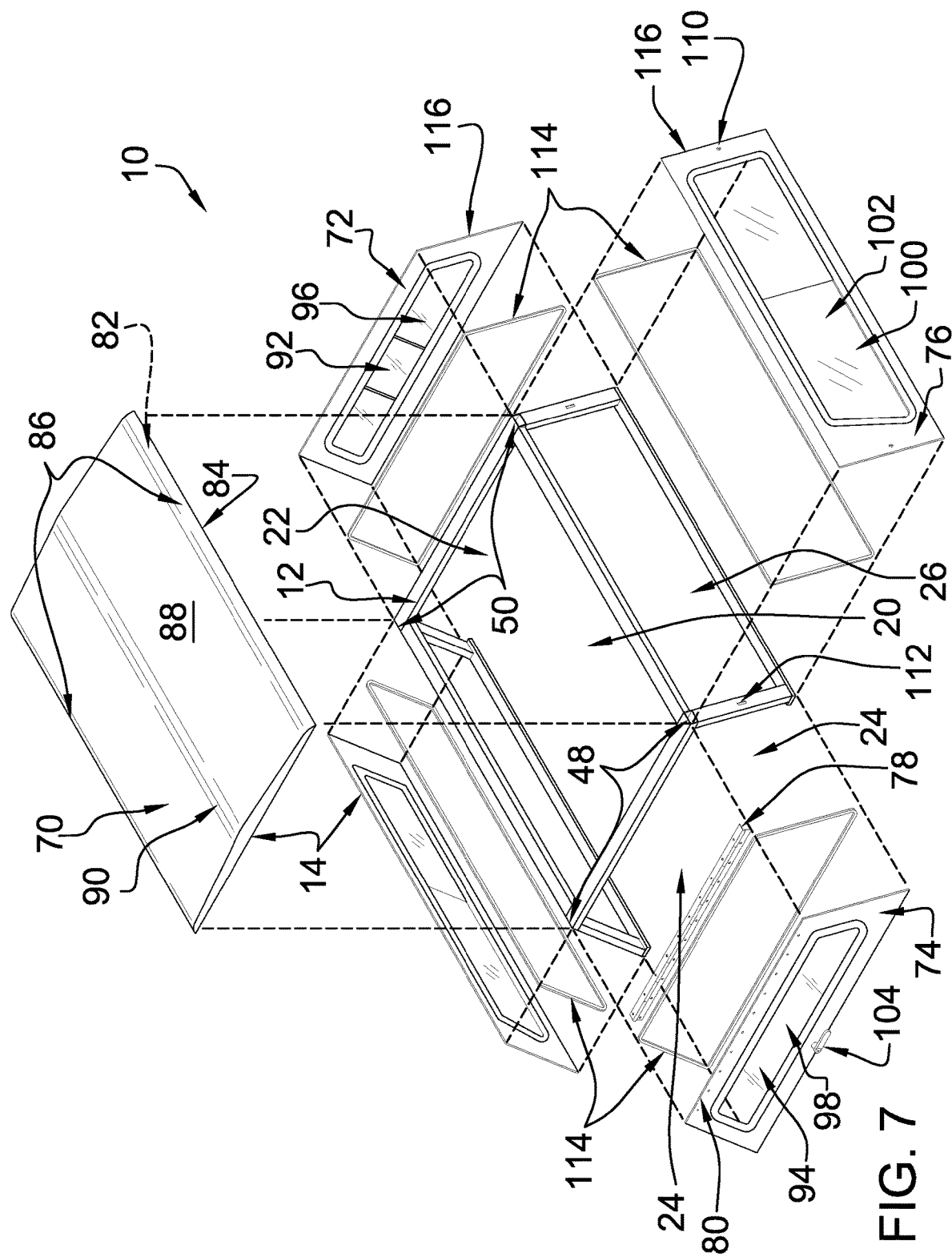
FIG. 7 is an exploded view of an embodiment of the disclosure.

As shown in FIG. 7, the front panel 72 and each of the side panels 76 has a respective pair of first fasteners 106 engaged thereto. A plurality of second fasteners 108 is engaged to the frame 12. The second fasteners 108 are complementary to the first fasteners 106 so that each pair of first fasteners 106 is positioned to selectively engage associated second fasteners 108 to removably engage the front panel 72 and the pair of side panels 76 to the frame 12.

Each first fastener 106 comprises a keyed latch 110 and each second fastener 108 comprises a latch hole 112, which is positioned the frame 12. The keyed latch 110 is positioned to selectively engage an associated latch hole 112 to lock an associated one of the front panel 72 and the side panels 76 to the frame 12.

The modular canopy assembly 10 also comprises a set of gaskets 114. Each gasket 114 is engaged to a respective one of the front panel 72, the rear panel 74, and the pair of side panels 76 so that the gasket 114 extends around a circumference 116 thereof. The gasket 114 is positioned to sealably engage the frame 12 as the respective one of the front panel 72, the rear panel 74, and the pair of side panels 76 is engaged thereto.

Figure 4:
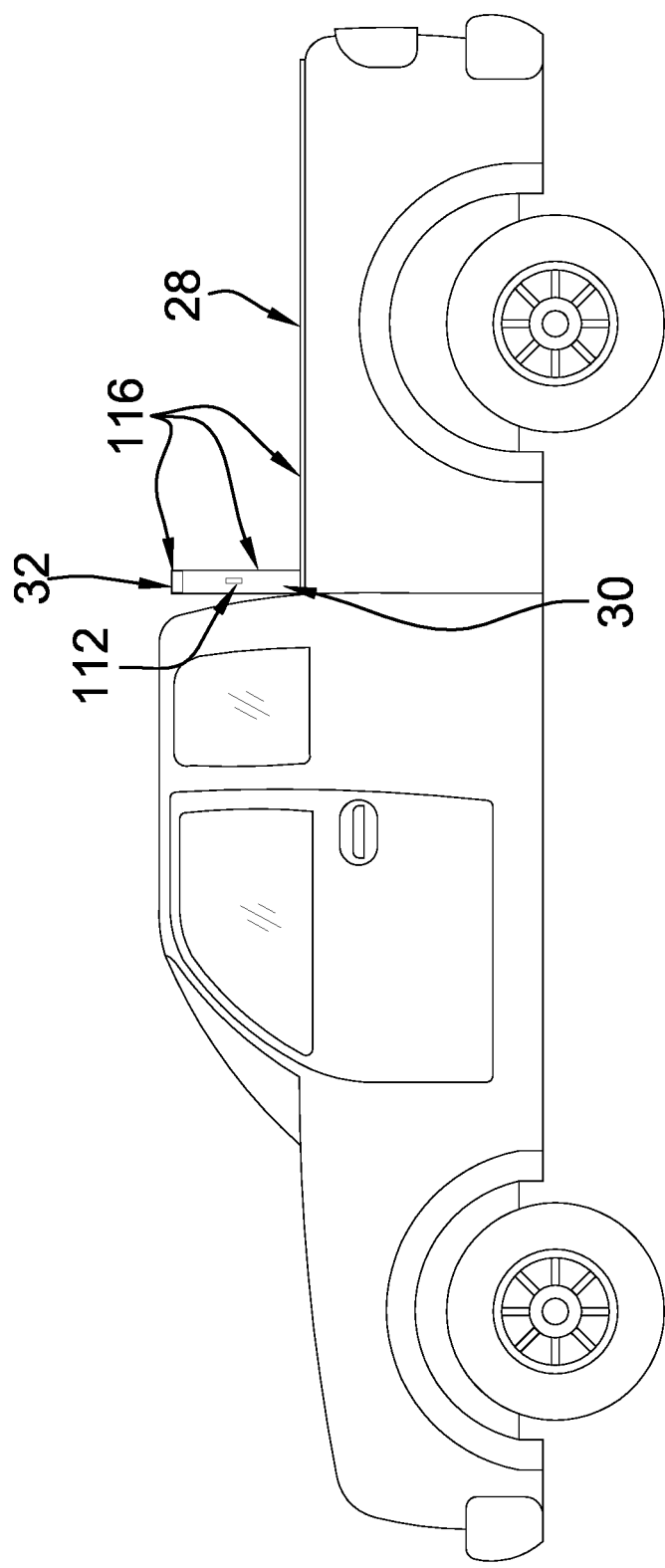
FIG. 4 is an in-use view of an embodiment of the disclosure.

In use, the set of first elements 16 is permanently affixed to the sidewalls of the bed of the truck, as shown in FIG. 4. In this configuration, the bed of the truck is accessible from its rear and sides and can be used for transporting a large load without interference of the set of second elements 18 and the panels 14. The set of second elements 18 can be engaged to the set of first elements 16 to complete the frame 12, as shown in FIG. 3. In this configuration, the frame 12 is available for securing a load positioned in the bed via use of tie-downs. The panels 14 can be engaged to the frame 12, as shown in FIG. 2, to fully enclose the bed of the truck and to secure articles, such as tools and equipment, positioned therein.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A modular canopy assembly comprising:
a frame, the frame comprising a set of first elements configured to be mountable to a pair of rear sidewalls of a truck and a set of second elements selectively engageable to the set of first elements, such that the frame extends upwardly from the pair of rear sidewalls of the truck, the frame defining a top opening, a front opening, a rear opening, and opposed side openings; and
a set of panels, each panel being selectively engageable to the frame for closing a respective one of the top opening, the front opening, the rear opening, and the opposed side openings, wherein the panels are configured for selectively enclosing a bed of the truck;
wherein the set of first elements comprises:
a pair of lower side rails configured to be engaged singly to the rear sidewalls,
a pair of front posts, each front post being engaged to and extending from a forward end of a respective lower side rail, and
a front beam engaged to and extending between the front posts distal from the lower side rails;
wherein the set of second elements comprises:
a pair of rear posts, each rear post being selectively engageable to a rearward end of a respective lower side rail, such that the rear post extends in parallel with an associated front post,
a rear beam engaged to and extending between the rear posts distal from the lower side rail, and
a pair of upper side rails, each upper side rail having a first end and a second end selectively engageable to a respective opposed end of the rear beam and to a respective opposing end of the front beam, respectively, such that the upper side rail extends therebetween;
wherein each lower side rail has a mortice positioned therein proximate to the rearward end;
wherein the rear post has a tenon engaged thereto and extending from a lower end thereof, the tenon being complementary to the mortice positioned in the respective lower side rail, such that the mortice is positioned for selective insertion of the tenon for removably engaging the rear post to the respective lower side rail;
wherein the lower side rail has a set of first holes positioned therein adjacent to the mortice;
wherein the tenon has a set of second holes positioned therein, such that each second hole is aligned with an associated said first hole when the tenon is inserted in the mortice, positioning the second hole and the associated first hole for insertion of a respective article of mounting hardware for securing the rear post to the lower side rail;
wherein each opposed end of the rear beam and each opposing end of the front beam have a tab engaged thereto and extending therefrom, each of the tabs having a set of fastening holes positioned therethrough, wherein each of the fastening holes is configured for insertion of a respective article of mounting hardware for removably engaging the upper side rails to the front beam and the rear beam;
wherein the set of panels comprises:
a roof panel selectively engageable to the frame for closing the top opening,
a front panel selectively engageable to the frame for closing the front opening,
a rear panel selectively engageable to the frame for closing the rear opening, and
a pair of side panels, each side panel being selectively engageable to the frame for closing a respective opposed side opening;
wherein the roof panel has an upper surface, the upper surface tapering from a centerline of the roof panel to the opposed sides, wherein the roof panel is configured for shedding moisture;
the front panel and each of the side panels having a respective pair of first fasteners engaged thereto; and
a plurality of second fasteners engaged to the frame, the second fasteners being complementary to the first fasteners, such that each pair of first fasteners is positioned for selectively engaging associated second fasteners for removably engaging the front panel and the pair of side panels to the frame.

2. The modular canopy assembly of claim 1, wherein the rear posts and the front posts extend transversely from the lower side rails, such that an upper perimeter of the frame is circumferentially smaller than a lower perimeter thereof.

3. The modular canopy assembly of claim 1, wherein the roof panel has a pair of channels extending into a lower face thereof, each channel extending along a respective opposed side of the roof panel, such that the channel is positioned for slidable insertion of a respective upper side rail for removably engaging the roof panel to the frame.

4. The modular canopy assembly of claim 1, further including:
the front panel having a front cutout positioned therein; and
a front window engaged to the front panel and closing the front cutout.

5. The modular canopy assembly of claim 1, further including:
the rear panel having a rear cutout positioned therein; and
a rear window engaged to the rear panel and closing the rear cutout.

6. The modular canopy assembly of claim 1, further including:
each side panel having a side cutout positioned therein; and
a pair of side windows, each side window being engaged to a respective side panel and closing an associated side cutout.

7. The modular canopy assembly of claim 1, further including a hinge engaged to and extending between the frame and an upper edge of the rear panel, such that the rear panel is hingedly engaged to the frame.

8. The modular canopy assembly of claim 7, further including a latch handle rotationally engaged to the rear panel and being configured for selectively engaging a tailgate of the truck, such that the rear panel is fixedly engaged to the tailgate.

9. The modular canopy assembly of claim 8, wherein the latch handle is keyed, such that the latch handle is lockable.

10. The modular canopy assembly of claim 1, further including each first fastener comprising a keyed latch, each second fastener comprising a latch hole positioned in the frame, such that the keyed latch is positioned for selectively engaging an associated latch hole for locking an associated one of the front panel and the side panels to the frame.

11. The modular canopy assembly of claim 1, further including a set of gaskets, each gasket being engaged to a respective one of the front panel, the rear panel, and the pair of side panels such that the gasket extends around a circumference thereof, such that the gasket is positioned for sealably engaging the frame as the respective one of the front panel, the rear panel, and the pair of side panels is engaged thereto.

12. A modular canopy assembly comprising:
a frame, the frame comprising a set of first elements configured to be mountable to a pair of rear sidewalls of a truck and a set of second elements selectively engageable to the set of first elements, such that the frame extends upwardly from the pair of rear sidewalls of the truck, the frame defining a top opening, a front opening, a rear opening, and opposed side openings,
the set of first elements comprising:
 a pair of lower side rails configured to be engaged singly to the rear sidewalls, each lower side rail having a mortice positioned therein proximate to a rearward end thereof, each lower side rail having a respective set of first holes positioned therein adjacent to the mortice,
 a pair of front posts, each front post being engaged to and extending from a forward end of a respective lower side rail, and
 a front beam engaged to and extending between the front posts distal from the lower side rails;
the set of second elements comprising:
 a pair of rear posts, each rear post being selectively engageable to a rearward end of a respective lower side rail, such that the rear post extends in parallel with an associated front post, the rear post having a tenon engaged thereto and extending from a lower end thereof, the tenon being complementary to the mortice positioned in the respective lower side rail, such that the mortice is positioned for selective insertion of the tenon for removably engaging the rear post to the respective lower side rail, the tenon having a set of second holes positioned therein, such that each second hole is aligned with an associated said first hole when the tenon is inserted in the mortice, positioning the second hole and the associated first hole for insertion of a respective article of mounting hardware for securing the rear post to the lower side rail,
 a rear beam engaged to and extending between the rear posts distal from the lower side rail, and
 a pair of upper side rails, each upper side rail having a first end and a second end selectively engageable to a respective opposed end of the rear beam and to a respective opposing end of the front beam, respectively, such that the upper side rail extends therebetween;
each opposed end of the rear beam and each opposing end of the front beam having a tab engaged thereto and extending therefrom, each of the tabs having a set of fastening holes positioned therethrough, wherein each of the fastening holes is configured for insertion of a respective article of mounting hardware for removably engaging the upper side rails to the front beam and the rear beam;
the rear posts and the front posts extending transversely from the lower side rails, such that an upper perimeter of the frame is circumferentially smaller than a lower perimeter thereof;
a set of panels, each panel being selectively engageable to the frame for closing a respective one of the top opening, the front opening, the rear opening, and the opposed side openings, wherein the panels are configured for selectively enclosing a bed of the truck, the set of panels comprising:
 a roof panel selectively engageable to the frame for closing the top opening, the roof panel having a pair of channels extending into a lower face thereof, each channel extending along a respective opposed side of the roof panel, such that the channel is positioned for slidable insertion of a respective upper side rail for removably engaging the roof panel to the frame, the roof panel having an upper surface, the upper surface tapering from a centerline of the roof panel to the opposed sides, wherein the roof panel is configured for shedding moisture,
 a front panel selectively engageable to the frame for closing the front opening, the front panel having a front cutout positioned therein,
 a rear panel selectively engageable to the frame for closing the rear opening, the rear panel having a rear cutout positioned therein, and
 a pair of side panels, each side panel being selectively engageable to the frame for closing a respective opposed side opening, each side panel having a side cutout positioned therein;
a front window engaged to the front panel and closing the front cutout;
a rear window engaged to the rear panel and closing the rear cutout;
a pair of side windows, each side window being engaged to a respective side panel and closing an associated side cutout;
a hinge engaged to and extending between the frame and an upper edge of the rear panel, such that the rear panel is hingedly engaged to the frame;
a latch handle rotationally engaged to the rear panel and being configured for selectively engaging a tailgate of the truck, such that the rear panel is fixedly engaged to the tailgate, the latch handle being keyed, such that the latch handle is lockable;
the front panel and each of the side panels having a respective pair of first fasteners engaged thereto;
a plurality of second fasteners engaged to the frame, the second fasteners being complementary to the first fasteners, such that each pair of first fasteners is positioned for selectively engaging associated second fasteners for removably engaging the front panel and the pair of side panels to the frame, each first fastener comprising a keyed latch, each second fastener comprising a latch hole positioned in the frame, such that the keyed latch is positioned for selectively engaging an associated latch hole for locking an associated one of the front panel and the side panels to the frame; and
a set of gaskets, each gasket being engaged to a respective one of the front panel, the rear panel, and the pair of side panels such that the gasket extends around a circumference thereof, such that the gasket is positioned for sealably engaging the frame as the respective one of the front panel, the rear panel, and the pair of side panels is engaged thereto.

* * * * *